3,498,927
PROCESS FOR APPLYING POROUS COATINGS ON CATALYST SUPPORTS

Alvin B. Stiles, Welshire, Wilmington, Del., assignor to E. I. du Pont de Nemours and Company, Wilmington, Del., a corporation of Delaware
No Drawing. Filed Apr. 19, 1967, Ser. No. 631,881
Int. Cl. B01j 11/48, 11/36, 11/38
U.S. Cl. 252—451                                5 Claims

ABSTRACT OF THE DISCLOSURE

A method of applying porous coatings to catalyst supports, particularly supports having smooth surfaces, by slurrying a finely divided form of a refractory oxide in a solution of a salt of the oxide, adding sufficient volatile base to the slurry to cause it to gel, and applying the gel to the support. After the gel has been applied, the desired catalytic material is then coated or impregnated in the gel coating by conventional techniques and the resulting structure is dried and calcined.

In another aspect, the slurry can contain the desired catalytic material, and this slurry is gelled, applied, dried and calcined to produce a catalytic structure.

BRIEF SUMMARY OF THE INVENTION

This invention relates to processes for applying catalytic materials to supports. More particularly, this invention relates to processes for applying porous, high surface area coatings to catalytic supports having smooth surfaces and low surface area by the use of a gel of a refractory oxide.

It has been difficult to apply catalytic material to catalyst supports which have a smooth surface without the use of materials which will adversely affect the catalytic activity. This is particularly true of rugged catalyst supports which are usually very dense, non-porous and have smooth surfaces.

Conventional processes are known in the art for improving the surface porosity or the surface area of catalyst supports such that under microscopic conditions they will appear to have an unsmooth surface. However, when the process of the invention is used, it is not necessary to use these conventional techniques. The process of the invention will work with catalytic supports having surfaces which are microscopically smooth.

I have found that if a very finely divided refractory oxide is suspended or slurried in a salt or salts of the oxide, and the slurry is gelled by the addition of an amount of volatile base to raise the pH to 7.2 or higher, a relatively thick layer of this gel can be applied or caused to adhere to the smooth surface of the support. This coating is porous, strongly adherent to the support, abrasion resistant, easily impregnated with catalytic metals, and most importantly, the coating has a high surface area.

Useful refractory oxides include zirconium, titanium, aluminum, chromium, manganese, zinc, thorium, beryllium, magnesium, calcium, strontium, lanthanum, silicon, barium and the rare earths. The salts of the oxides include the nitrate, sulfate, chloride, phosphate, formate, acetate, hydroxyacetate, propionate, and other cations that do not have an adverse catalytic effect and are water soluble.

The volatile bases which can be used include ammonia, ammonium hydroxide, ammonium carbonate, alkyl amines, hydroxylamine, hydroquinone, and other volatile organic bases.

After the refractory oxide coating has been applied to the support, it is impregnated with the desired catalytic metal by any of the art methods, e.g., immersing the coated support into a salt solution of the catalytic material such that the salt is adsorbed by the coating and then drying and calcining. Further, the catalytic agent can be precipitated onto the coated support, and if the coated support and catalytic agent are sublimable, the catalytic agent may be deposited on the coating by this method.

In another aspect of the process of the invention, the desired catalytic metal can be incorporated into the slurry prior to the gelling step, and then applied with the gel, thus avoiding the necessity of two separate steps.

The process of the invention can also be used to apply catalytic materials to porous supports; however, the real advantages of the process are realized when it is used to apply catalytic materials to smooth surfaces.

DETAILED DESCRIPTION OF THE INVENTION

The support material on which the catalytic coating is to be applied can be any type of support material, i.e., porous or not; however, the process of the invention is particularly suited for use with supports having smooth surfaces.

Exemplary of useful support materials are the following: glass, metals, alloys, fused alumina, fused silica, mullite, beryl, zirconia, zircon, porcelain, dense sintered almina, chromia, spinel, magnesia, fused magnesia, lanthana and titania.

The process of the invention is particularly useful in applying catalytic coatings to alumina honeycombs made by the in situ oxidation of aluminum honeycomb as described in U.S. Patent 3,255,027 to Talsama. In this process an aluminum foil honeycomb is coated with a fluxing agent as sodium silicate, and fired in an oxygen atmosphere to oxidize the aluminum to alumina. For further details on the process, reference can be made to the Talsma patent.

The size and the form of the support is immaterial and it can be orientated or unorientated, thus it can be in the form of a honeycomb or it could be in the form of pellets, granules, spheres, corrugated shapes, bars, rods, tubes, rolls, saddles, screens, beads, spirals, coils, or any of the conventional shapes of the art.

When the process of the invention is used with supports having porous structures, the process of the invention is highly effective in that it results in the coating of the entire surface of such a structure and particularly the external portions where normally, catalytic reactions take place.

To the above supports is then applied a gel which is made from a slurry of a refractory oxide with a salt of the oxide, which slurry is then gelled by the addition of a base to pH 7.2 or higher. Additionally, the slurry can also contain a catalytic metal and this modified slurry is then converted into a gel by the addition of base.

The refractory oxides which can be used are the oxides of aluminum, magnesium, thorium, beryllium, zinc, calcium, strontium, the rare earths, lathanum, zirconium titanium, chlorium, barium, manganese and silicon.

The refractory oxides used should be in a finely divided form. The crystallite size of the ultimate particle should be less than 1500 angstroms in its greatest dimension and preferably less than 100 angstroms. Such particles are most preferably in the form of unitary crystals and if in the dry form, they should be pulverulent to the ultimate particles. Ideally, the form is a colloidal suspension in which the particles are all in the range mentioned, though dispersions or suspensions can be used in which there is some aggregation of particles.

The determination of crystallite size can be made by conventional X-ray analytical techniques. A suitable method is shown in X-Ray Diffraction Procedures by H. P. Klug and L. E. Alexander, published by John Wiley & Sons, New York, 1954 edition.

The salt to be incorporated into the slurry is generally the salt of the refractory oxide; however, if desired, the salt of a different oxide can be used if they are catalytically acceptable to each other.

The salt can be the nitrate, sulfate, chloride, phosphate, formate, acetate, hydroxyacetate, propionate, oxalate, malonate, glycinate, or any other anion as long as it is water soluble and does not have an adverse catalytic effect.

The preparation of the slurry ordinarily begins by forming a dispersion of the refractory oxide with a salt of a refractory oxide, preferably the salt of the same refractory oxide. However, the salt can be that of a different oxide provided that the two materials are catalytically satisfactory to each other.

The slurry is thus produced by adding the salt and refractory oxide together with rapid agitation, milling or grinding. The refractory oxide should be at least 1% and preferably at least 3% of the slurry and can range as high as 97%.

The salt should be at least 3% of the slurry in order to have proper adhesion to the support and can range up to as high as 75% of the slurry. Generally, the salt will be between 20 to 40% of the slurry.

As previously mentioned, the slurry can optionally contain catalytic materials. If present, the catalytic material would comprise 0.1 to 60% by weight of the slurry. Most catalytic materials can be used; exemplary of these materials are the finely divided particles of the oxides, hydroxides, carbonates, chromates, chromites, cerates, tungstates, manganites, and molybdates, vanadates, stannates, and arsonates, antimonates, uranates, and ferrites of nickel, cobalt, manganese, silver, iron, chromium, cadmium, zinc, tin, mercury, bismuth, palladium, platinum, ruthenium, uranium, arsenic, antimony, thallium, calcium, strontium, barium, zirconium, copper, lanthanum and the rare earths, and elemental silver, platinum, palladium, rhodium, irridium, osmium and ruthenium.

Typical catalytic materials which are suitable for use in the method of the invention include: copper chromite, calcium chromate, barium chromate, ferrous chromite, cobaltic chromite, nickelic chromite, copper manganite, calcium manganite, ferrous manganite, cobaltous manganite, nickelous manganite, calcium molybdate, barium molybdate, calcium tungstate, barium tungstate, ferrous tungstate, manganous tungstate, cobaltous tungstate, nickelous tungstate, cupric tungstate, calcium cerate, barium cerate, copper cerate, calcium oxide, silver oxide, cuprous oxide, barium oxide, chromic oxide, plumbic oxide, manganese oxide, cobaltic oxide and nickelic oxide.

Instead of using just the catalytic active material, the process of the invention is also useful when this material has been aggregated with an interspersant by techniques known in the art. Thus the catalytic material or materials selected can be formed into aggregates in which the crystallites of the catalytic material are kept apart by a refractory material which melts above 1000° C. and which is called an interspersant.

To make these aggregates a colloidal dispersion or a suspension of an active catalytic material, as described, is placed in a liquid medium, preferably water, and to this is added the interspersant. The interspersant is in solution or in colloidal dispersion or suspension or can be formed in situ by chemical reaction between suitable reactants.

The interspersants, the chemical nature of which will be described further hereinafter, are of a size comparable to the catalytic material. Thus the crystallite size should preferably not be notably larger than 1500 angstroms and it is more preferred that the size be no greater than 500 and, still better, no greater than in the range of about 50 angstroms.

After the interspersant has been added to the catalytically active material as described, the catalyst distended with the interspersant is then dried and heated further to remove water and to decompose the catalyst, if need be, and the interspersant, if need be.

The calcination temperature should be below that at which sintering occurs and it is generally between 200° and 500° C.

After the calcining, the interspersant can be part of the catalyst; that is, it can be a solid solution with the catalytic materials such as a spinel. On the other hand it can be just a physical admixture.

The resulting catalytic agglomerate should have a particle size of less than 150 mesh; this can be accomplished by conventional milling techniques.

Useful interspersants include the previously mentioned catalytic material or other materials not catalytically harmful as long as the material has a melting point above 1000° C.

The interspersants are of a size comparable to the catalytic material. Thus the crystallite size should preferably not be notably larger than 1500 angstroms in its greatest dimension and it is more preferred that the size be not greater than 500 and still more preferred no greater than 50 angstroms.

Suitable interspersants include in general any refractory material which is or can be in the form of crystallites in the size range described. Preferred interspersants are the following: beryllium oxide, magnesium oxide, calcium oxide, zinc oxide, cadmium oxide, barium oxide, strontium oxide, aluminum oxide, lanthanum oxide, silicon oxide, titanium dioxide, zirconium oxide, hafnium oxide, chromic oxide, manganese oxide, barium titanate, zirconium silicate, magnesium aluminate, cerium oxide, calcium titanate, aluminum chromite, barium silicate, zirconium silicate, magnesium silicate, calcium silicate, strontium silicate, magnesium titanate, strontinum titanate, calcium titanate, barium zirconate, magnesium zirconate, calcium zirconate, strontium zirconate, barium cerate, magnesium cerate and calcium cerate.

With respect to the interspersant used, it is of course obvious that in some applications the condition for which the final catalyst will be used will determine which interspersants can be used. Thus, in an operation such as methane reforming where one has $CO_2$ present at high temperatures, one would not use strontinum, barium or calcium because these compounds would form carbonates; spalling of the catalyst would occur.

Additional details on how interspersants can be incorporated, or further, how a second interspersant can also be incorporated into the catalytic agglomerate can be found in my copending application Ser. No. 499,897, filed Oct. 21, 1965, and the disclosure of this application is incorporated herein by reference.

After the slurry has been formed, base is added to cause the slurry to gel. This will require the addition of sufficient base to produce a pH of 7.2 or higher.

Useful bases include ammonia, ammonium hydroxide, ammonium carbonate, alkyl amines, hydroxylamine, hydroquinone, and other volatile organic bases. The important factor is that the base used is one that is vaporized in the subsequent drying and calcining steps.

The gel, optionally containing the catalytic material, or the catalytic material with the interspersant, is then applied to the support. The gel can be applied by any of the conventional means such as spraying or immersion. After the gel has been applied to the support, which under some circumstances can be two or three different sprayings with a drying step interposed in between, the coated support is then air dried and calcined or if desired it could be calcined immediately without the intervening air-drying step. The coating thus applied can range in thickness from a monomolecular layer up to a thickness of 10.0 mils. The thickness used is not critical and depends upon the conditions of the catalytic reaction for which the catalyst is to be used.

It is one of the advantages of the process of the invention that layers of thickness approaching 10 mils can be caused to adhere to the smooth surface of the support.

The temperature of the calcining operation will be in the range of 100 to 500° C. but can range as high as 700 to 800° C. The calcining step should be conducted at such a rate over a period of time such that spalling or explosive decrepitation are avoided, otherwise the timing is not critical.

In the embodiments wherein the gel does not contain the catalytic material, after the gel has been applied to the smooth surface support, the desired catalytic materials can be coated or otherwise applied in a conventional manner to the gel coating and subsequently dried and calcined and activated.

Though not an essential feature of the process of the invention, if desired, catalytic promoters can be added to the gel before it is applied to the support or subsequently with the catalytic material and calcined. Thus barium nitrate, calcium nitrate, chromium nitrate, and the like can be added.

After the calcining step, if necessary, the conventional activating treatments can be conducted. Thus the catalyst can be reduced, oxidized, halogenated, chlorinated, brominated, sulfated, sulfited, sulfided, amminated or aminated.

The catalyst of the present invention can be used in the same way as the prior art catalyst containing the same active catalytic materials. Specific catalysts and suggested uses will be given in the examples. Exemplary of the uses of the catalysts of the invention are the use of nickel in methane reforming and hydrogenation in general, cobalt in the hydrogenation of material such as adiponitrile to hexamethylenediamine, manganese for oxidation reactions, silver for olefinic oxidations and methanol to formaldehyde, iron for the preparation of ammonia synthesis gas and the use of copper and silver for dehydrogenations.

In order that the invention may be better understood, reference should be made to the following illustrative examples. In the examples, parts refer to parts by weight unless otherwise indicated.

EXAMPLE 1

A copper chromite catalyst is made by dissolving the equivalent of 63.5 parts of elemental copper as the copper nitrate salt in 1,000 parts by weight of distilled water. Additionally 100 parts by weight of chromic oxide ($CrO_3$) is dissolved in 1000 parts by weight of distilled water.

The two solutions are combined and are heated while being agitated to 30° C. Ammonium hydroxide is added over a period of 30 minutes to increase the pH to 6.8. The slurry is agitated for 60 minutes and then is filtered. The filter cake is dried and calcined for 2 hours at 450° C. The material thus obtained is copper chromite.

100 parts by weight of copper chromite is slurried in 300 parts by weight of distilled water in which is dissolved 75 parts by weight of aluminum nitrate nonahydrate. While the slurry is being agitated, ammonium hydroxide is added to raise the pH to 7.1. A very thick gel is thereby formed which contains aluminum hydroxide and copper chromite in an intimate dispersion.

This material is applied to a support structure which is an alumina honeycomb made by the in situ oxidation process of U.S. Patent 3,255,027.

The structure with the moist catalytic gel is dried and calcined at 400° C.

Instead of the aluminum nitrate one can use equal stoichiometric quantities of magnesium, rare earths, calcium, strontium, barium, lanthanum, thorium and beryllium as the nitrates or as other salts which are sufficiently soluble in the quantity of water used. With other soluble salts, a larger quantity of water may be used. In lieu of the copper chromite, others can be used such as nickel chromite.

In addition to the aluminum nitrate specified in the third paragraph in this example, there can be used as much as 50 parts by weight of finely divided gamma alumina. Lesser quantities than 50 parts can be used if desired to obtain a suitably adherent slurry. Adjustment of water content may be necessary to obtain satisfactory handling properties for the slurry.

Instead of finely divided aluminum oxide, there can be used the oxides of magnesium, the rare earths, calcium, barium, strontium, lanthanum, thorium, beryllium, silicon, titanium, zirconium, hafnium, manganese or barium.

EXAMPLE 2

A nickel-alumina methane conversion catalyst is prepared by dissolving the equivalent of 330 parts of elemental nickel as nickel-nitrate salt in 5000 parts of distilled water. There is slurried also in this solution 180 parts of alumina hydrate in finely divided form such as that designated C–730 produced by the Aluminum Company of America. The solution-slurry is heated to 80° C. and sufficient ammonium carbonate is added to the solution to raise the pH to 7.2. Thereafter the precipitate is filtered, dried and calcined for 3 hours at 800° C. to produce the nickel-alumina catalyst.

100 parts of the finely divided catalyst produced above is slurried in 300 parts by weight of distilled water in which is dissolved 102 parts by weight of magnesium-chloride hexahydrate. Ammonium hydroxide is now added to the solution-slurry to increase the pH to 7.0 where precipitation of magnesium hydroxide is complete.

The slurry thus produced is used to coat ceramic structures in the form of 1 inch by 1 inch rhombohedrons having honeycomb configuration with 3/16 inch cell openings.

After coating the ceramic structures they are dried and finally calcined for 1 hour at 800° C. in an oxidizing atmosphere. The catalyst thus produced is effective for the conversion of hydrocarbons plus steam to carbon monoxide, carbon dioxide and hydrogen at low temperatures and extremely high space velocity.

Instead of magnesium chloride, stoichiometric quantities of magnesium acetate, magnesium sulfate, propionate, hydroxyacetate or formate can be used.

Instead of magnesium chloride as stipulated in the foregoing, there can be used a stoichiometric equivalent of thorium chloride, lanthanum chloride, aluminum nitrate, zirconium nitrate or hafnium nitrate or nitrates of the rare earth metals.

EXAMPLE 3

165 parts by weight of nickel as nickel nitrate is dissolved in 6000 parts by weight of distilled water. There is next dissolved in this same solution 300 parts by weight of chromium trioxide ($CrO_3$). The solution is heated to 65° C. and ammonium carbonate is then added to raise the pH to 7.4. The precipitate which is formed is filtered, dried and finally calcined for 2 hours at 400° C.

300 parts by weight of the nickel-chromite catalyst thus produced is slurried in 400 parts by weight of distilled water in which is dissolved 92 parts by weight of magnesium nitrate trihydrate and 187 parts by weight of aluminum nitrate nonahydrate. Next, sufficient anhydrous ammonia is added to the solution-slurry to raise the pH to 7.1 where both the magnesium and aluminum are precipitated as a mixture of their respective hydroxides. This slurry is then used to coat ceramices in the from of ½ inch by ½ inch cylinders with ¼ inch holes which are then dried and calcined at 300° C. The catalyst thus produced is effective for the hydrogenation of carbon monoxide to methane in gas purification operations and for the hydrogenation of benzene to cyclohexane

EXAMPLE 4

100 parts by weight of activated alumina having a surface area of 275 sq. meters per gram and which will pass 100% through a 200 mesh screen is slurried in 250 parts by weight of distilled water to which is added 5 parts by weight of elemental platinum as chloroplatinic acid. Ammonium hydroxide or ammonium carbonate solution is then added to raise the pH to 9.5. At this point a 10% solution of hydrazine hydrate in distilled water is added in sufficient quantity to completely precipitate the platinum onto the alumina. The catalyst is then filtered, washed on the filter and finally calcined at 250° C. in a flow of air to activate the catalyst.

150 parts of the catalyst thus prepared is slurried in 500 parts by weight of distilled water containing 100 parts by weight of finely divided thorium oxide which will pass 100% through a 325 mesh screen and 185 parts by weight of thorium-nitrate tetrahydrate. Anhydrous ammonia vapor is then bubbled through the solution until a pH of 7.2 is reached and the thorium has been precipitated as thorium hydroxide. The slurry thus produced can be appiled to smooth surfaces such as metal tubing of heat exchangers, glass tubing, ceramic balls, tubing, rings or saddles or "Nichrome" or "Inconel" as ribbon, wire or sponge to produce an adherent coating which on drying and calcining produces an effective platinum catalyst. Such catalysts are useful for ammonia oxidation, waste gas combustion, oxidation of sulfur dioxide to sulfur trioxide, hydrogenation of benzene to cyclohexane, hardening of unsaturated fats and oils by hydrogenation of the double bonds and for the abatement of nitrogen oxide fumes by reduction to nitrogen and water vapor.

Instead of the 5 parts by weight of platinum specified above, there can be used as much as 50 parts by weight of platinum to achieve higher activity per unit of surface of the catalyst layer.

Instead of the platinum specified there can be used rhodium, palladium, ruthenium, osmium or iridium or their mixtures.

Instead of the thorium oxide and thorium nitrate there can be used stoichiometric equivalents of lanthanum, hafnium or zirconium.

EXAMPLE 5

An iron molybdate catalyst is prepared by dissolving 80 parts by weight of ammonium molybdate,

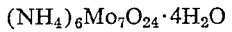

in 400 parts by weight of distilled water at 30° C. There is added to this solution 60 parts by weight of 38% hydrochloric acid, then immediately thereafter 68 parts by weight of ferric chloride hexahydrate dissolved in 300 parts by weight of distilled water. The precipitate is filtered, washed, dried, and pulverized to 100% through a 100 mesh screen.

200 parts by weight of the iron molybdate thus obtained is slurried in 500 parts by weight of distilled water containing 15 parts by weight of colloidal silica and 110 parts by weight of magnesium nitrate hexahydrate. This solution-slurry is milled together for 18 hours in a ball mill. The milled material is removed from the ball mill and sufficient dimethylamine is added to raise the pH to 7.0±0.3 pH. The resultant gel is used to coat ceramic honeycomb structures and the slurry is subsequently dried and calcined for 1 hour at 400° C. The catalyst thus derived is effective for the oxidation of methanol to formaldehyde and propylene to acrolein. It is also useful for the preparation of acrylonitrile from propylene, air and ammonia.

Instead of the magnesium nitrate specified above, there can be used stoichiometrically equivalent amounts of beryllium nitrate, barium nitrate or calcium nitrate.

EXAMPLE 6

A silver supported on alpha-alumina catalyst is prepared by the pulverization of alpha-alumina so that it will pass 100% through 325 mesh screen. 100 parts by weight of the resultant alpha-alumina is slurried in 300 parts by weight of distilled water containing additionally 20 parts by weight of elemental silver as silver nitrate. The silver is next precipitated onto the alpha-alumina as silver carbonate using either sodium carbonate or ammonium carbonate as the precipitants. After precipitation is complete, the precipitate is filtered and washed to remove foreign ions. The precipitate is next dried and finally calcined at 250° C. to decompose the silver carbonate and form silver-silver oxide supported on alumina.

100 parts by weight of the catalyst thus produced is slurried in a solution-slurry comprising 250 parts by weight of distilled water, 50 parts by weight of finely divided barium oxide and 73 parts by weight of anhydrous barium nitrate. Sufficient ammonium hydroxide is added to the solution-slurry to cause the precipitation of the barium hydroxide as a gel and the resultant slurry is then used to coat honeycomb structures of ceramic materials. The ceramic materials can be fabricated from alumina, silica alumina or other refractory compositions. The film of slurry is dried and calcined at 400° C. to produce a film of silver supported on alpha-alumina and promoted with barium oxide. After the first coating has been completed, a second coating can be applied as previously described to produce a more uniformly and completely coated ceramic structure. The catalyst thus produced is useful for the oxidation of ethylene to ethylene oxide and for the oxidative dehydration of methanol to formaldehyde.

EXAMPLE 7

A nickel carbonate on kieselguhr catalyst is produced by dissolving 120 parts by weight of elemental nickel as nickel nitrate in 2000 parts by weight of distilled water. 300 parts by weight of pulverized kieselguhr is next added to the nickel nitrate solution. The slurry is now rapidly agitated and heated to 70° C. and the nickel is precipitated as the hydroxy-carbonate by the addition of sodium carbonate slowly as a spray until a pH of 7.6 is reached. The catalyst is allowed to remain at this temperature and pH for 60 minutes, then is quickly filtered, washed to remove foreign ions and is dried.

200 parts by weight of the pulverized nickel carbonate on kieselguhr thus obtained is slurried in 800 parts by weight of distilled water which additionally contains 100 parts by weight of finely divided zirconia and 100 parts by weight of zirconium nitrate. Anhydrous ammonia vapor is bubbled into the slurry-solution to increase the pH to 7.0±0.4. The resultant gel is coated onto honeycomb structures in the form of discs 12 inches in diameter and 1 inch thick and having vertical hexagonal holes which are ⅛ inch across the flats. The coating of slurry on the honeycomb structure is then dried and heated in a hydrogen atmosphere at 475° C. to cause reduction of the nickel carbonate to elemental nickel.

The catalyst thus produced is an effective hydrogenation catalyst for the conversion of benzene to cyclohexane for the saturation of unsaturated oils and fats and after partial sulfiding, for the selective hydrogenation of acetylene in the presence of ethylene.

I claim:

1. A process for applying adherent, high surface area coatings on a support having a smooth surface comprising preparing a slurry of finely divided particles of a refractory oxide with a salt of a refractory oxide, gelling the slurry by the addition of sufficient base to obtain a pH of 7.2 or higher, and applying said gel to the support and drying and calcining.

2. A process for applying adherent, high surface area coatings on a support having a smooth surface comprising preparing a slurry of finely divided particles of a refractory oxide selected from the group consisting of the oxides of zirconium, titanium, aluminum, chromium, manganese, zinc, thorium, beryllium, magnesium, calcium, strontium, barium, silicon, the rare earths and mixtures thereof with a salt of said oxides, gelling said slurry by adding sufficient base to said slurry to obtain a pH of 7.2 or higher, applying said gel to the support and drying and calcining.

3. The process of claim 2 wherein the salt is selected from the group consisting of the nitrates, sulfates, chlorides, phosphates, formates, acetates, hydroxyacetates, oxalates, malonates, glycinates and propionates of an element selected from the group consisting of zirconium, titanium, aluminum, chromium, manganese, zinc, thorium, beryllium, magnesium, calcium, strontium, barium, silicon and the rare earths.

4. The process of claim 2 wherein the slurry contains a material selected from the group consisting of the finely divided particles of the oxides, hydroxides, carbonates, chromates, chromites, cerates, tungstates, manganites, molybdates, vanadates, stannates, arsonates, antimonates, uranates and ferrites of an element selected from the group consisting of nickel, cobalt, manganese, silver, iron, chromium, cadmium, zinc, tin, mercury, bismuth, palladium, platinum, ruthenium, uranium, arsenic, antimony, thallium, calcium, strontium barium, zirconium, copper and the rare earths, and elemental silver, platinum, palladium, rhodium, iridium, osmium and ruthenium.

5. The method of claim 2 wherein the coating applied is impregnated with a catalytic metal prior to the calcining step.

References Cited
UNITED STATES PATENTS

| | | | |
|---|---|---|---|
| 2,580,806 | 1/1952 | Malina | 252—463 |
| 2,270,503 | 1/1942 | Burk et al. | 252—317 XR |
| 2,910,444 | 10/1959 | Cramer | 252—317 XR |
| 3,255,027 | 6/1966 | Talsma. | |
| 3,264,228 | 8/1966 | Burbidge | 252—463 |
| 3,352,636 | 11/1967 | Wilson et al. | 252—463 XR |

PATRICK P. GARVIN, Primary Examiner

U.S. Cl. X.R.

252—454, 455, 457, 458, 461, 462, 463, 464, 465, 466, 467, 468, 469, 470, 471, 472, 475